United States Patent
Park et al.

(10) Patent No.: US 9,715,063 B2
(45) Date of Patent: Jul. 25, 2017

(54) LIGHT INTERCONNECTION DEVICE USING PLASMONIC VIA

(71) Applicant: SAMSUNG ELECTRONICS CO., LTD., Suwon-si (KR)

(72) Inventors: Yeonsang Park, Seoul (KR); Younggeun Roh, Seoul (KR); Jineun Kim, Suwon-si (KR); Changwon Lee, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/859,756

(22) Filed: Sep. 21, 2015

(65) Prior Publication Data

US 2016/0161671 A1 Jun. 9, 2016

(30) Foreign Application Priority Data

Dec. 4, 2014 (KR) .................. 10-2014-0173235

(51) Int. Cl.
*G02B 6/122* (2006.01)
*G02B 6/125* (2006.01)
*G02B 6/43* (2006.01)

(52) U.S. Cl.
CPC ............. *G02B 6/122* (2013.01); *G02B 6/125* (2013.01); *G02B 6/43* (2013.01)

(58) Field of Classification Search
CPC .................................................. G02B 6/1226
See application file for complete search history.

(56) References Cited

U.S. PATENT DOCUMENTS

| | | | |
|---|---|---|---|
| 6,828,606 B2 | 12/2004 | Glebov | |
| 7,239,779 B2 | 7/2007 | Little | |
| 7,466,880 B2 | 12/2008 | Windover | |
| 7,693,363 B2* | 4/2010 | Dionne | G02F 1/025 359/237 |
| 2011/0126895 A1 | 6/2011 | Uda et al. | |
| 2012/0006981 A1* | 1/2012 | Van Dorpe | B82Y 20/00 250/227.11 |
| 2013/0070459 A1 | 3/2013 | Kim et al. | |
| 2013/0209026 A1 | 8/2013 | Doany et al. | |
| 2014/0218738 A1* | 8/2014 | Bartoli | G01N 21/45 356/450 |
| 2014/0376856 A1 | 12/2014 | Roh et al. | |
| 2015/0117015 A1 | 4/2015 | Roh et al. | |

FOREIGN PATENT DOCUMENTS

| | | |
|---|---|---|
| KR | 10-2013-0030100 A | 4/2001 |
| KR | 10-2014-0148240 A | 12/2014 |
| KR | 10-2015-0050093 A | 5/2015 |

OTHER PUBLICATIONS

Raburn et al., "3-D Photonic Circuit Technology", IEEE Journal of Selected Topics in Quantum Electronics, vol. 8, No. 4, Jul./Aug. 2002, pp. 935-942.

Selvaraja et al., "Demonstration of optical via and low-loss optical crossing for vertical integration of silicon photonic circuit", Topic: IOE (Integrated Optics and Optoelectronic Devices), 1 total page.

* cited by examiner

*Primary Examiner* — Omar R Rojas
(74) *Attorney, Agent, or Firm* — Sughrue Mion, PLLC

(57) ABSTRACT

A light interconnection device includes a metal-insulator-metal (MIM) waveguide including first and second metal layers and a dielectric layer provided between the first and second metal layers, and a plasmonic antenna including a slot penetrating through the second metal layer.

16 Claims, 12 Drawing Sheets

LIGHT INTERCONNECTION DEVICE USING PLASMONIC VIA

CROSS-REFERENCE TO RELATED APPLICATIONS

This application claims priority from Korean Patent Application No. 10-2014-0173235, filed on Dec. 4, 2014, in the Korean Intellectual Property Office, the disclosure of which is incorporated herein in its entirety by reference.

BACKGROUND

1. Field

The exemplary embodiments relate to a light interconnection device.

2. Description of the Related Art

Semiconductor integrated circuits (ICs) have used electrical communication to electrically transmit and receive data. The semiconductor ICs are integrated on a printed circuit board (PCB) and electrically communicate with one another through wires. However, there is electrical resistance between the semiconductor ICs. Also, electrical communication may be affected by interference from external electronic waves. Therefore, it is difficult to increase the communication speed between the semiconductor ICs.

An optical interconnection or optical communication can be used to increase the communication speed between the semiconductor ICs. If the electrical signal exchange between devices is replaced with an optical signal, there is little interference due to external electronic waves, and high-speed communication is possible.

In the semiconductor ICs, 3-dimensional (3D) structure conduction vias have contributed to making the semiconductor ICs compact. Electronic devices have been replaced with optical devices according to increasing demands for high signal speeds. As a representative example of integration of a 3D optical device, there is a structure in which existing silicon waveguides (WGs) are 3-dimensionally integrated on a silicon on insulator (SOI) substrate. Even in this case, a 3D optical via may be used to increase integration efficiency. The 3D optical via may be achieved by a 3D realization of an optical fiber or an optical WG and the 3D optical via uses a high level integration technology. Also, a technology for transmitting light in a desired direction may be used to efficiently transmit energy.

SUMMARY

One or more exemplary embodiments provide a light interconnection device using a plasmonic via.

Additional aspects will be set forth in part in the description which follows and, in part, will be apparent from the description, or may be learned by practice of the presented exemplary embodiments.

According to an aspect of an exemplary embodiment, there is provided a light interconnection device including: a first metal-insulator-metal (MIM) waveguide that includes first and second metal layers and a dielectric layer provided between the first and second metal layers; and a first plasmonic antenna that includes a first slot penetrating through the second metal layer.

The first slot may have a hexahedral shape.

The first slot may have a rectangular parallelepiped shape having a first depth corresponding to a thickness of the second metal layer, and a first short width and a first long width perpendicular to the first depth.

At least one of the first short width and the first long width may be configured to be adjusted to thereby adjust a resonance wavelength of the first plasmonic antenna.

The directions of the first short width and the first long width may be configured to be adjusted to thereby adjust directivity of the first plasmonic antenna.

The first plasmonic antenna may further include a first nano structure that is provided on the second metal layer and is adjacent to the first slot.

The first nano structure may include a groove that is formed in the second metal layer or a protrusion structure that protrudes from the second metal layer.

The first slot may have a rectangular parallelepiped shape having a first depth corresponding to a thickness of the second metal layer, and a first short width and a first long width perpendicular to the first depth.

The first nano structure may have a rectangular parallelepiped shape having a second depth corresponding to a thickness of the second metal layer, and a second short width and a second long width perpendicular to the second depth.

The second depth may be less than the first depth.

The dielectric layer may include first and second clad layers respectively contacting the first and second metal layers and a core layer provided between the first and second clad layers. A dielectric constant of the core layer may be higher than dielectric constants of the first and second clad layers.

The light interconnection device may further include a light-emitting structure configured to supply light into the first MIM waveguide.

The light interconnection device may further include a second plasmonic antenna that is provided between the light-emitting device and the first MIM waveguide that may include a second slot penetrating through the first metal layer.

The light interconnection device may further include a second nano structure that is provided on the first metal layer and is adjacent to the second slot.

The second nano structure may include a groove that is formed in the first metal layer or a protrusion structure that protrudes from the first metal layer.

The second nano structure and the second slot may have rectangular parallelepiped shapes, wherein at least one of a depth, a long width, and a short width of the each of the rectangular parallelepiped shapes of the second nano structure and the second slot are different from each other.

According to additional aspects of an exemplary embodiment, there is provided a light interconnection device including: a second MIM that includes a third metal layer spaced apart from the second metal layer and a dielectric layer provided between the second and third metal layers; and a third plasmonic antenna that includes a third slot penetrating through the third metal layer.

The third plasmonic antenna may further include a third nano structure that is provided on the third metal layer and is adjacent to the third slot.

The light interconnection device may further include a fourth plasmonic antenna that is spaced apart from the third slot along the second MIM waveguide that includes a fourth slot penetrating through the third metal layer.

The fourth plasmonic antenna may further include a fourth nano structure that is provided on the third metal layer and is adjacent to the fourth slot.

According to additional aspects of an exemplary embodiment, there is provided a light interconnection device including: a waveguide including a first metal layer, a second metal layer, and a dielectric layer interposed between the first metal layer and the second metal layer, the dielectric layer defining a first light path; and a slot penetrating from an external surface of the second metal layer to the dielectric layer, the slot defining a second light path; wherein the slot is configured to emit light incident along the first light path to the external surface of the second metal layer along the second light path via interconnection between the dielectric layer and the slot.

The slot and the dielectric layer may be configured to be perpendicular to each other.

The light interconnection may include a protrusion structure that protrudes from a top surface of the second metal layer adjacent to the slot, wherein the protrusion structure is configured to modify the directivity of light emitted along the second light path.

The light interconnection device may further include a groove provided in a top surface of the second metal layer adjacent to the slot, wherein the groove is configured to modify the directivity of light emitted along the second light path.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
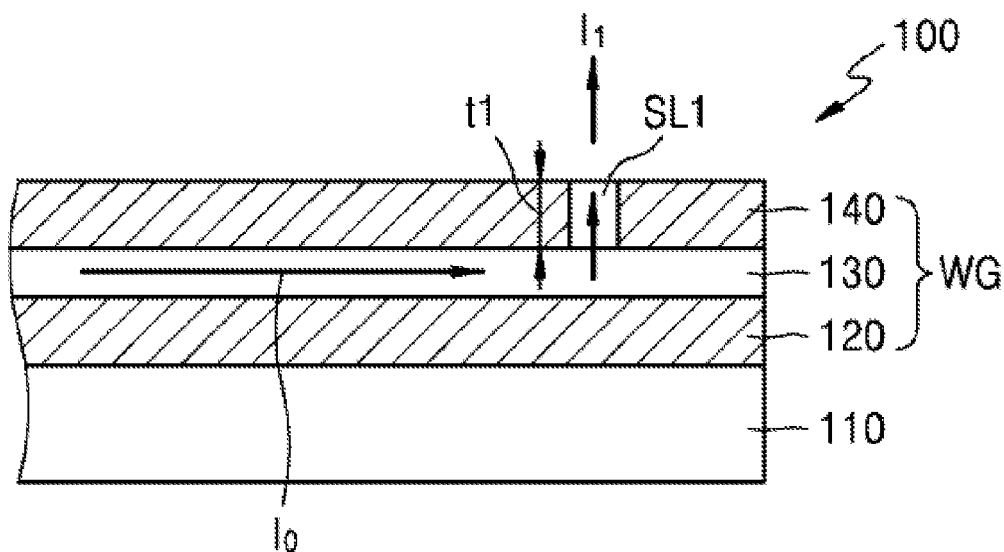
FIG. 1 is a cross-sectional view illustrating a schematic structure of a light interconnection device according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the exemplary embodiments. Expressions such as "at least one of," when preceding a list of elements, modify the entire list of elements and do not modify the individual elements of the list.

It will be understood that when an element, such as a layer, a region, or a substrate, is referred to as being "on," "connected to" or "coupled to" another element, the element may be directly on, connected or coupled to the other element or intervening elements may be present. In contrast, when an element is referred to as being "directly on," "directly connected to" or "directly coupled to" another element or layer, there are no intervening elements or layers present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section.

As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Figure 2:
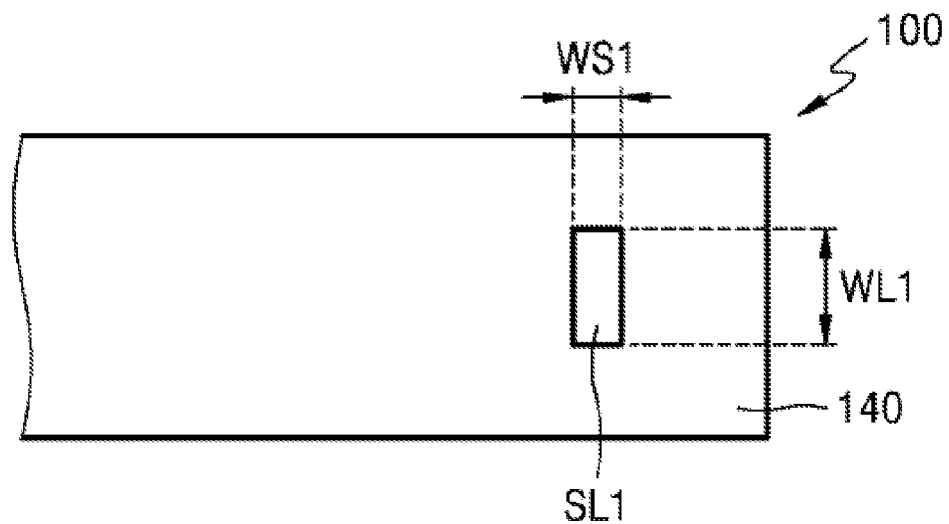
FIG. 2 is a view illustrating a slot shape of a plasmonic antenna of the light interconnection device of FIG. 1.

FIG. 1 is a cross-sectional view illustrating a schematic structure of a light interconnection device 100 according to an exemplary embodiment. FIG. 2 is a view illustrating a slot SL1 of a plasmonic antenna of the light interconnection device 100 of FIG. 1.

The light interconnection device 100 includes two metal layers 120 and 140, a dielectric layer 130 disposed between the two metal layers 120 and 140, and the slot SL1 penetrating through the metal layer 140. The metal layer 120, the dielectric layer 130, and the metal layer 140 may be stacked on a substrate 110.

The light interconnection device 100 may be configured to interconnect light between a light source and an optical device, between a light source and an electronic device, between a plurality of optical devices, or the like, and may also perform the function of a waveguide (WG) and cause a light path change.

The metal layer 120, the dielectric layer 130, and the metal layer 140 form a MIM (metal-insulator-metal) waveguide WG, wherein incident light $I_0$ is guided along a direction of the MIM waveguide WG.

The slot SL1 formed in the metal layer 140 constitutes a plasmonic antenna. The slot SL1 creates an optical connection between two layers that are separated from each other by a metal material between the two layers, due to a plasmonic effect. More specifically, light incident into the slot SL1 penetrating through the metal layer 140 interacts with electrons existing on an interface with the metal layer 140 in the slot SL1 to produce surface plasmon. When the motion of the light corresponds to the motion of the electrons of the metal layer 140, the electromagnetic energy of the incident light is converted to electronic motion energy, and thus light passes in the form of surface plasmon through the slot SL1. Since the light passes in the form of surface plasmon through the slot SL1, the slot SL1 may be referred to as a plasmonic via. Slots that will be described hereinafter are also referred to as plasmonic vias, and thus the terms may be used interchangeably.

The slot SL1 may have a hexahedral shape or a rectangular parallelepiped shape having a depth t1, and a short width WS1 and a long width WL1 extending in a direction perpendicular to the depth t1 as shown in FIGS. 1 and 2. The depth t1 may be equal to a thickness of the metal layer 140. At least one of the short width WS1 and the long width WL1 may have a dimension of a sub wavelength order. In other words, at least one of the short width WS1 and the long width WL1 may have a dimension smaller than the wavelength of light to be transmitted. However, the shape of the slot SL1 is not limited thereto. The slot SL1 may be an empty opening or may be filled with the same or a different dielectric material as dielectric layer 130. The plasmonic antenna strongly concentrates light having a preset wavelength band according to the particular dimensions of the slot SL1. This function of the slot SL1 is performed by surface plasmon resonance occurring on a boundary between a metal material and a dielectric material. At least one of the short width WS1 and the long width WL1 may be adjusted to adjust a resonance wavelength of the plasmonic antenna. In other words, the particular dimensions of the slot SL1 may be determined in consideration of a wavelength, transmission efficiency, etc., of light that is an object of a light connection.

The substrate 110 may be formed of various kinds of materials. The substrate 110 may be an insulating substrate, a semiconductor substrate, or the like.

The metal layers 120 and 140 may be formed of a highly conductive metal material in which surface plasmon excitation may occur. For example, the metal layers 120 and 140 may be formed of at least one selected from the group consisting of copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), gold (Au), and any combination thereof.

The dielectric layer 130 may be formed of various kinds of dielectric materials. For example, the dielectric layer 130 may be formed of at least one selected from the group consisting of $SiO_2$, $HfO_2$, $Al2O_3$, $Si_3N_4$, and any combination thereof. A preferred material of the dielectric layer 130 may be determined according to a particular wavelength band, for instance the wavelength band of the light that travels along the MIM waveguide WG. For instance, the dielectric layer 130 may be formed of a material that does not readily absorb the particular wavelength band of the light that travels along the MIM waveguide WG, such that the dielectric layer is transparent with respect to the light traveling along the MIM waveguide WG.

In operation, the incident light $I_0$ is incident into the light interconnection device 100, travels along the MIM waveguide WG, is focused and resonates toward the plasmonic antenna including the slot SL1 having a dimension designed to focus light having a corresponding wavelength band, and is emitted from the light interconnection device 100. The emission efficiency of emitted light $I_1$ with respect to the incident light $I_0$ depends on the efficiency of the MIM waveguide WG constituting the light interconnection device 100 and the efficiency of the plasmonic antenna.

Figure 3:
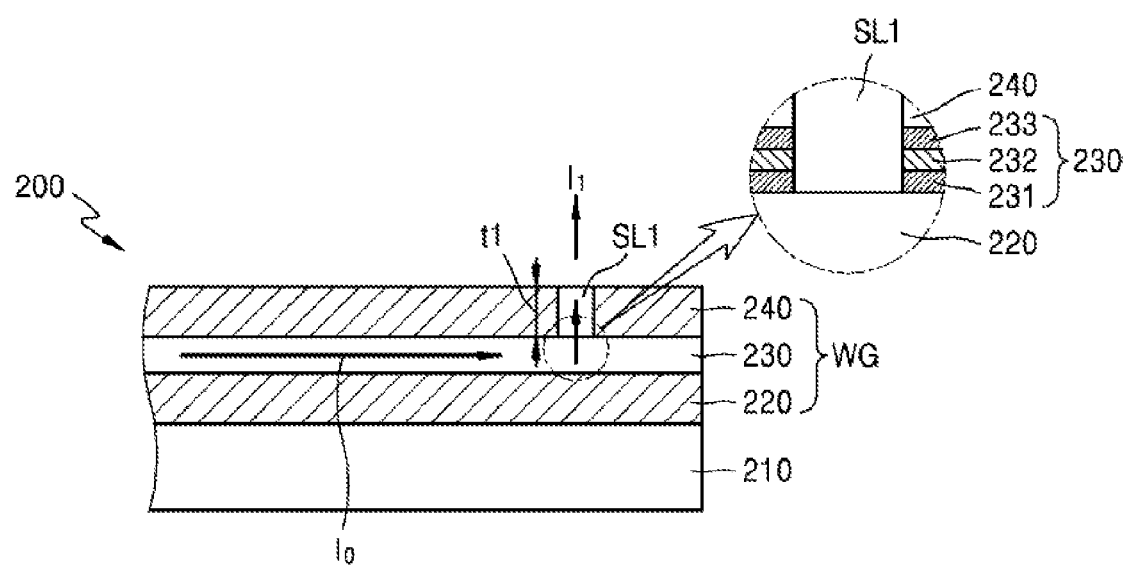
FIG. 3 is a cross-sectional view illustrating a schematic structure of a light interconnection device according to another exemplary embodiment.

FIG. 3 is a cross-sectional view illustrating a schematic structure of a light interconnection device 200 according to another exemplary embodiment.

The light interconnection device 200 includes a metal layer 220, a dielectric layer 230, and a metal layer 240 that are sequentially stacked on a substrate 210. A slot SL1 is formed to penetrate through the metal layer 240 and thus constitutes a plasmonic antenna.

The dielectric layer 230 may include two clad layers 231 and 233 and a core layer 232. The core layer 232 and the clad layers 231 and 233 are formed of dielectric materials. Also, a material of the core layer 232 may be selected to have a higher dielectric constant than the dielectric constants of the clad layers 231 and 233.

The above-described structure of the dielectric layer 230 is configured to increase transmission efficiency of an MIM waveguide WG. When light travels along the MIM waveguide WG, a total reflection occurs on the boundary between the dielectric layer 230 and the metal layers 220 and 240. Here, the efficiency of the total reflection occurring on the boundary between the dielectric layer 230 and the metal layers 220 and 240 is not 100%, and a small loss may occur. If the core layer 232 having a high dielectric constant is disposed in the center, and the clad layers 231 and 233 contact the metal layers 220 and 240, light mainly travels along the core layer 232. In other words, the loss that may occur between the metal layers 220 and 240 and the clad layers 231 and 233 may be reduced.

In exemplary embodiments that will be described hereinafter, a dielectric layer used in a light interconnection device is illustrated as a single layer but may be modified into a multilayer structure having clad layers and a core layer as in the present exemplary embodiment.

Figure 4:
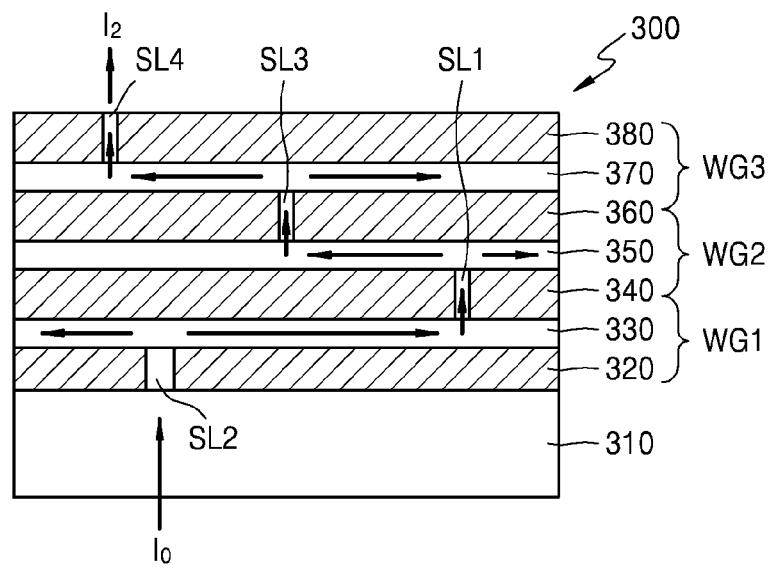
FIG. 4 is a cross-sectional view illustrating a schematic structure of a light interconnection device according to another exemplary embodiment.
Figure 5:
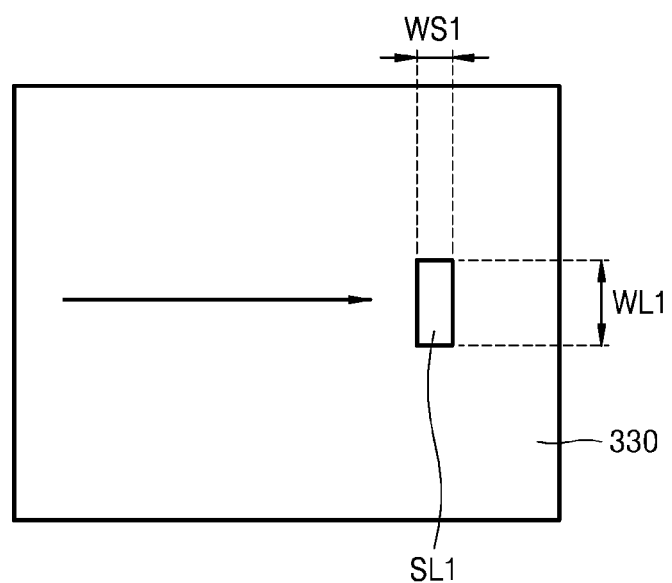
FIGS. 5, 6, 7, 8, 9 and 10 are views illustrating exemplary light paths through a plasmonic antenna according to the orientation and shape of a slot of the plasmonic antenna.
Figure 6:
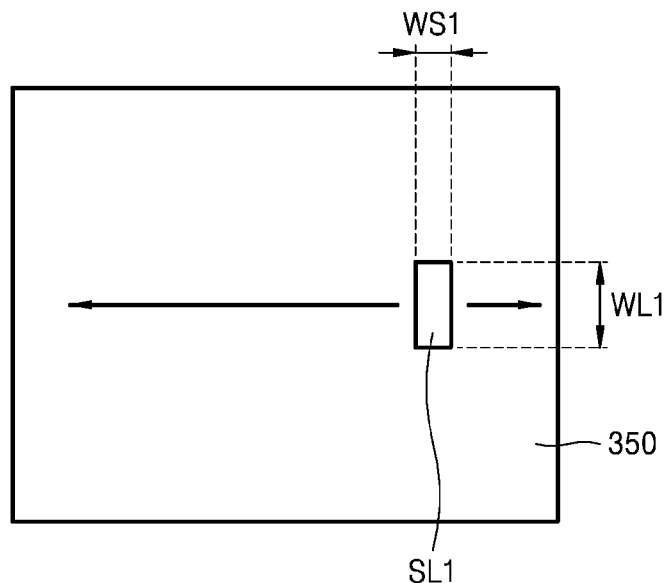

FIG. 4 is a cross-sectional view illustrating a schematic structure of a light interconnection device 300 according to another exemplary embodiment. FIGS. 5 and 6 are views illustrating a path of light that is transmitted to another layer by a plasmonic antenna of the light interconnection device 300.

The light interconnection device 300 includes a plurality of metal layers 320, 340, 360, and 380 and a plurality of dielectric layers 330, 350, and 370. The metal layers 320, 340, 360, and 380 alternate with the dielectric layers 330, 350, and 370.

The light interconnection device 300 may further include a light-emitting structure 310 configured to generate light and transmit the light to another device.

The light-emitting structure 310 may include a light-emitting layer configured to generate light, e.g., a laser diode (LD), a light-emitting diode (LED), a super luminescent diode (SLD), or the like. The light-emitting structure 310 may generate light having a wavelength band corresponding to visible rays, near infrared (IR) rays, terahertz waves, microwaves, or the like. The light-emitting structure 310 may include a semiconductor quantum well structure, a light-emitting dye, a quantum dot, or the like, and a light-emitting layer material appropriate for the kind of light to be generated.

Two metal layers and a dielectric layer disposed between the two metal layers form an MIM waveguide. In other words, the metal layer 320, the dielectric layer 330, and the metal layer 340 form an MIM waveguide WG1, the metal layer 340, the dielectric layer 350, and the metal layer 360 form an MIM waveguide WG2 in another layer, and the metal layer 360, the dielectric layer 370, and the metal layer 380 form an MIM waveguide WG3 in another layer.

The MIM waveguide WG1 and the MIM waveguide WG2 are connected to each other by a plasmonic antenna including a slot SL1, and the MIM waveguide WG2 and the MIM waveguide WG3 are connected to each other by a plasmonic antenna including a slot SL3. A plasmonic antenna including a slot SL4 is formed in the metal layer 380 that is an uppermost layer so as to emit light $I_2$ from the light interconnection device 300.

A plasmonic antenna including a slot SL2 may be disposed between the light-emitting structure 310 and the MIM waveguide WG1. A width of the slot SL2 may be wider than those of the slots SL1, SL3, and SL4, but it is not limited thereto. The slot SL2 may be formed as a waveguide that guides light generated by the light-emitting structure 310 toward the MIM waveguide WG1.

In operation, light $I_0$ generated by the light-emitting structure 310 is incident into the MIM waveguide WG1 through the slot SL2. Incident light travels in two directions along the MIM waveguide WG1. Here, the path of the portion of the incident light heading toward the slot SL1 is directed into the MIM waveguide WG2 through the slot SL1, and thus a portion of the incident light travels along the MIM waveguide WG2. Among the portions of incident light traveling in two directions along the MIM waveguide WG2, the path of the portion of the light heading toward the slot SL3 is directed through the slot SL3, and thus a portion of the light is incident into the MIM waveguide WG3. Also, light $I_2$ is emitted from the light interconnection device 300 through the slot SL4.

In FIG. 4, the plurality of metal layers 320, 340, 360, and 380 and the plurality of dielectric layers 330, 350, 370 form three layers of MIM waveguides, WG1, WG2, and WG3. However, this is only an exemplary embodiment and MIM waveguides of two layers or MIM waveguides of three or more layers may be formed. Also, the plasmonic vias, e.g., the slots SL1, SL2, SL3, and SL4, may be designed to have the same shape and dimensions, or may have different shapes and dimensions.

The particular path of light passing through a slot constituting a plasmonic antenna is determined by an arrangement of the slot. This will be described with reference to the exemplary path of light related to the slot SL2 in FIGS. 5 and 6.

FIG. 5 illustrates an exemplary path of light toward the slot SL1 in the dielectric layer 330. The light path changes direction in the vicinity of the slot SL1 and is directed into the slot SL1. The light is incident to the slot SL1 along a direction of the short width WS1 of the slot SL1, and is emitted through the slot SL1, resonating along a direction of the short width WS1 in the slot SL1. In other words, the light travels in a direction perpendicular to the long width WL1 of the slot SL1 in the dielectric layer 350.

According to this principle, the orientation of the slot SL1 may be adjusted to adjust the direction of the light passing through the slot SL1. In the present exemplary embodiment, the direction of the light toward the slot SL1 in the dielectric layer 330 is perpendicular to the long width WL1 of the slot SL1. Therefore, after the light passes through the slot SL1, the light travels along two directions, that is, the same direction as before being incident into the slot SL1 in the dielectric layer 350 and opposite direction thereof.

FIGS. 7 through 10 are views illustrating exemplary light paths through a plasmonic antenna according to the shape of a slot of the plasmonic antenna.

Figure 7:
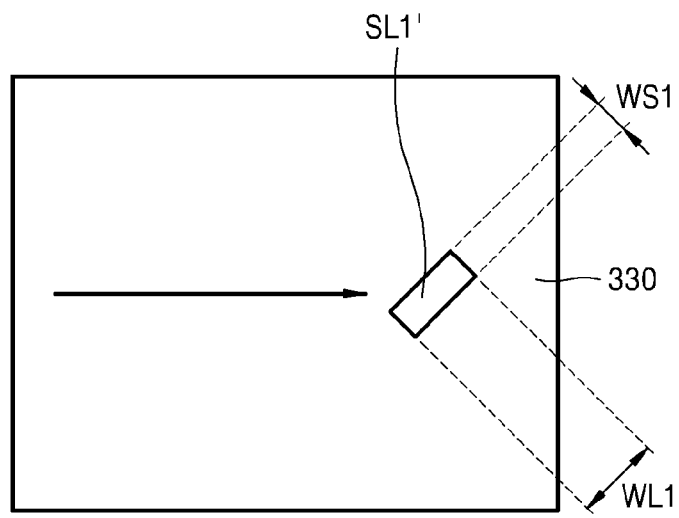
Figure 8:
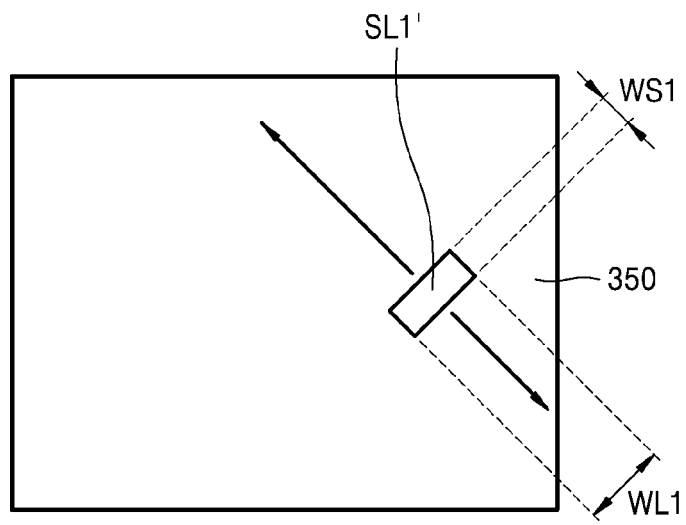

Referring to FIGS. 7 and 8, a slot SL' is oriented obliquely with respect to a light path in the dielectric layer 330. Light focused in the slot SL1' resonates in the direction of the short width WS1 and is emitted such that the light travels in two directions, both being parallel with the short width WS1 of the slot SL1' in the dielectric layer 350.

Figure 9:
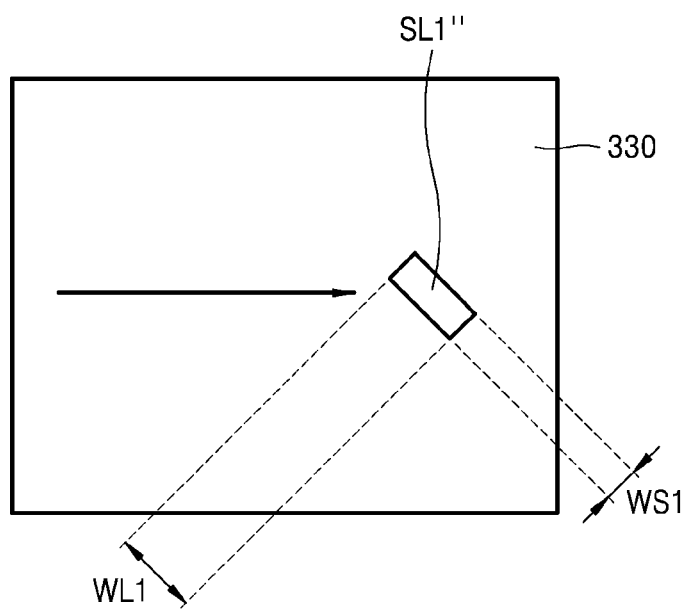
Figure 10:
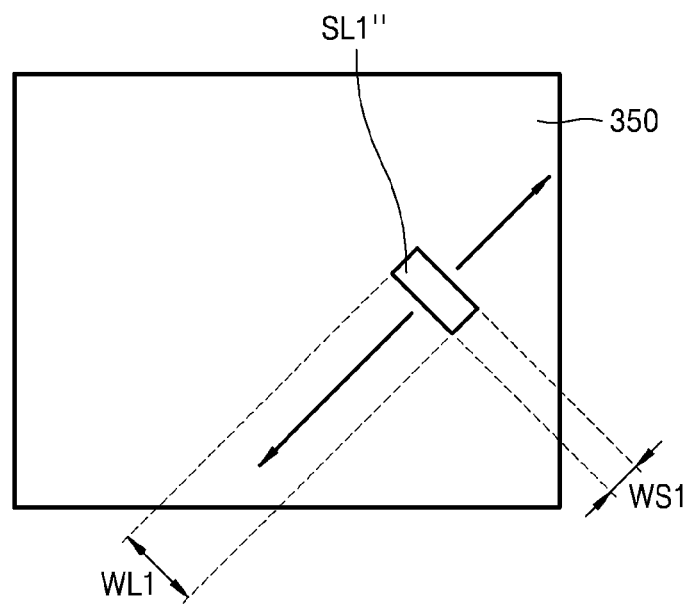

Referring to FIGS. 9 and 10, a slot SL1" is oriented obliquely with respect to a light path in the dielectric layer 330. The arrangement of slot SL1" is such that the arrangement of slot SL1' shown in FIGS. 7 and 8 is rotated 90 degrees. Light focused in the slot SL1" resonates in a direction of the short width WS1 and is emitted such that the light travels in two directions, both being parallel with the short width WS1 of the slot SL1" in the dielectric layer 350.

Figure 11:
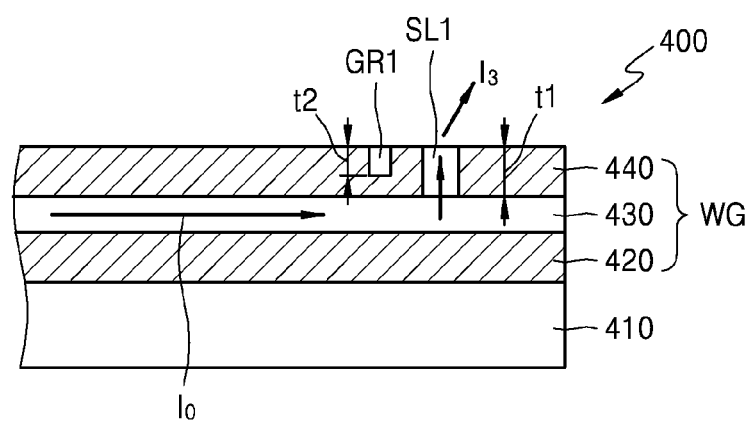
FIG. 11 is a cross-sectional view illustrating a schematic structure of a light interconnection device according to another exemplary embodiment.
Figure 12:
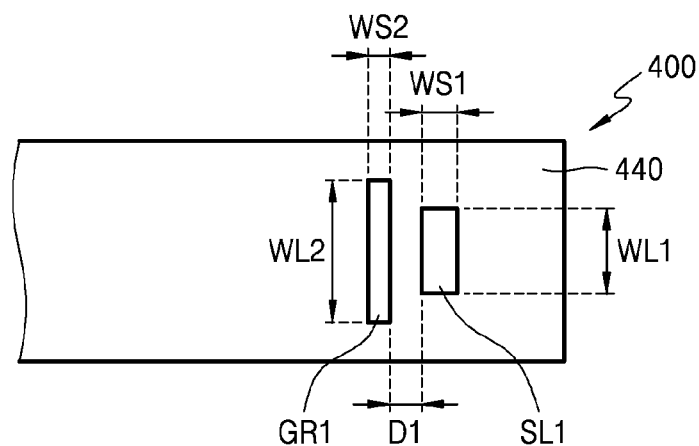
FIG. 12 is a view illustrating a detailed shape of a plasmonic antenna of the light interconnection device of FIG. 11.

FIG. 11 is a cross-sectional view illustrating a schematic structure of a light interconnection device 400 according to another exemplary embodiment. FIG. 12 is a view illustrating a detailed shape of a plasmonic antenna of the light interconnection device 400 of FIG. 11.

The light interconnection device 400 includes two metal layers 420 and 440, a dielectric layer 430 disposed between the two metal layers 420 and 440, and the plasmonic antenna formed in the metal layer 440. The metal layer 420, the dielectric layer 430, and the metal layer 440 may be stacked on a substrate 410.

The metal layer 420, the dielectric layer 430, and the metal layer 440 form an MIM waveguide WG, such that the incident light $I_0$ is guided along a direction of the MIM waveguide WG.

In the present exemplary embodiment, the plasmonic antenna includes a slot SL1 that penetrates through the metal layer 440 and a nano structure GR1 that is formed in the metal layer 440 adjacent to the slot SL1. This structure is configured to enable the plasmonic antenna to have directivity. Light that travels along the MIM waveguide WG is focused and resonates in the slot SL1. Also, when the light is emitted through the slot SL1, the light is emitted in a direction away from which the nano structure GR1 is formed. Therefore, directivity is formed in a direction opposite to the nano structure. In other words, since the nano structure GR1 is formed on the left of the slot SL1, light emitted from the slot SL1 has directivity heading above the right side of the slot SL1.

Detailed shapes of the slot SL1 and the nano structure GR1 constituting the plasmonic antenna will now be described.

The slot SL1 and the nano structure GR1 may have hexahedral shapes or may respectively have rectangular parallelepiped shapes as shown in FIGS. 11 and 12. The slot SL1 may have a rectangular parallelepiped shape having a depth t1 corresponding to a thickness of the metal layer 440, and a short width WS1 and a long width WL1 perpendicular to the depth t1. The nano structure GR1 may be a groove that is formed in the surface of the metal layer 440, and the groove may have a rectangular parallelepiped shape having a depth t1, and a short width WS2 and a long width WL2 perpendicular to the depth t2. However, shapes of the slot SL1 and the nano structure GR1 are not limited thereto. The slot SL1 and the nano structure GR1 may be empty openings or may be filled with the same or different dielectric material as the dielectric layer 430.

The depth t2 of the nano structure GR1 may be less than the depth t1 of the slot SL1. The long width WL2 of the nano structure GR1 may be equal to or different from the long width WL1 of the slot SL1. The short width WS2 of the nano structure GR1 may be equal to or different from the short width WS1 of the slot SL1. In FIGS. 11 and 12, the long width WL2 of the nano structure GR1 is wider than the long width WL1 of the slot SL1, and the short width WS2 of the nano structure GR1 is narrower than the short width WS1 of the slot SL1. However, this is only an exemplary embodiment and the long and short widths are not limited thereto.

As in the previously-described exemplary embodiments, one of the long width WL1 and the short width WS1 of the slot SL1 may be changed to change a resonance wavelength of the plasmonic antenna. Also, in the present exemplary embodiment, when light penetrates the slot SL1 in the form of surface plasmon, the direction of the emitted light is adjusted by an interaction with the nano structure GR1. More specifically, the slot SL1 having a resonance structure connected to the MIM waveguide WG through which light travels operates as a feed of the plasmonic antenna. Also, the nano structure GR1 interacts with surface plasmon emitted from the feed to operate as a reflector. In other words, light passing through the slot SL1 has directivity by virtue of the nano structure GR1. The directivity formed by the nano structure GR1 may be, in detail, adjusted by at least one of the long width WL2, the short width WS2, the depth t2 of the nano structure GR1, and a distance D1 of the nano structure GR1 from the slot SL1.

A single nano structure GR1 is illustrated in FIGS. 11 and 12, but a plurality of nano structures may be included to form directivity. For example, as shown in FIGS. 11 and 12, besides the nano structure GR1 that is designed to operate as a reflector on the left side of the slot SL1, a nano structure having a dimension designed to operate as a director may be further disposed on the right side of the slot SL1.

In operation, incident light $I_0$ is incident into the light interconnection device 400, travels along the MIM waveguide WG, is focused and resonates toward the plasmonic antenna including the slot SL1 having a dimension designed to focus light having a corresponding wavelength band, and is emitted from the light interconnection device 400. Emitted light $I_3$ has directivity by virtue of the nano structure GR1 as shown in FIGS. 11 and 12.

Figure 13:
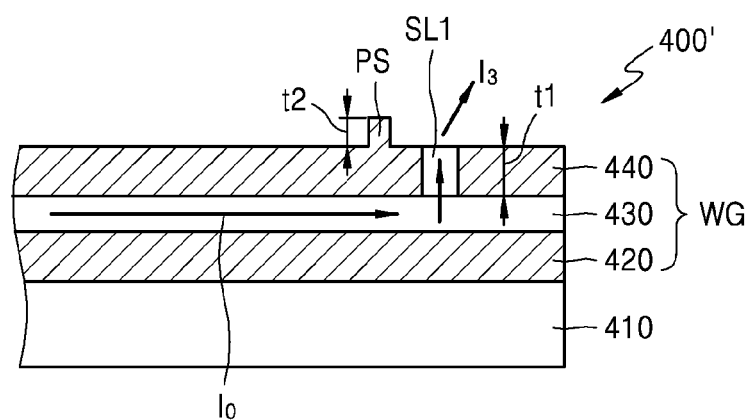
FIG. 13 is a cross-sectional view illustrating a schematic structure of a light interconnection device according to another exemplary embodiment.

FIG. 13 is a view illustrating a schematic structure of a light interconnection device 400' according to another exemplary embodiment.

The light interconnection device 400' includes two metal layers 420 and 440 formed on a substrate 410, a dielectric layer 430 disposed between the two metal layers 420 and 440, and a plasmonic antenna formed in the metal layer 440. The metal layer 420, the dielectric layer 430, and the metal layer 440 form an MIM waveguide WG such that incident light $I_0$ is guided along a direction of the MIM waveguide WG.

In the present exemplary embodiment, the plasmonic antenna includes a slot SL1 that penetrates through the metal layer 440 and a nano structure PS that is formed on the metal layer 440 adjacent to the slot SL1. The light interconnection device 400' of FIG. 13 is different from the light interconnection device 400 of FIG. 12 in that the nano structure PS is a structure protruding from a surface of the metal layer 440. The nano structure PS may be formed of a dielectric material or a metal material. As described with reference to FIG. 12, at least one of a short width WS1, a long width WL1, a depth t2 of the nano structure PS, and a distance of the nano structure PS from the slot SL1 may be adjusted to adjust directivity of light $I_3$ passing through the slot SL1.

One nano structure PS is formed on the left side of the slot SL1, but this is only an exemplary embodiment. A plurality of nano structures may be formed. More specifically, a nano structure having a dimension designed to operate as a director may be further disposed on the right side of the slot SL1.

The nano structures GR1 and PS of FIGS. 12 and 13 may be combined with each other. In other words, a groove shape and a protrusion shape may be included together on the same light interconnection device.

Figure 14:
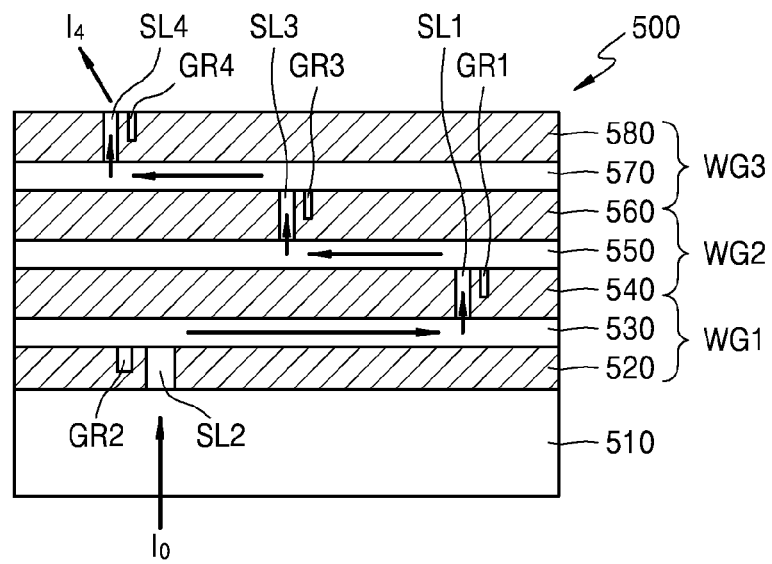
FIG. 14 is a cross-sectional view illustrating a schematic structure of a light interconnection device according to another exemplary embodiment.
Figure 15:
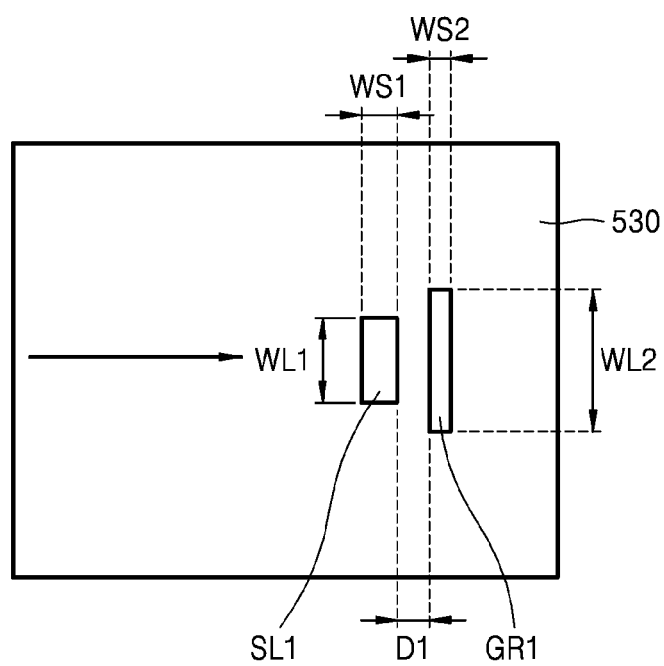
FIGS. 15, 16, 17, 18, 19 and 20 are views illustrating exemplary light paths through a plasmonic antenna according to the arrangement and shape of a slot and a nano structure of the plasmonic antenna.
Figure 16:
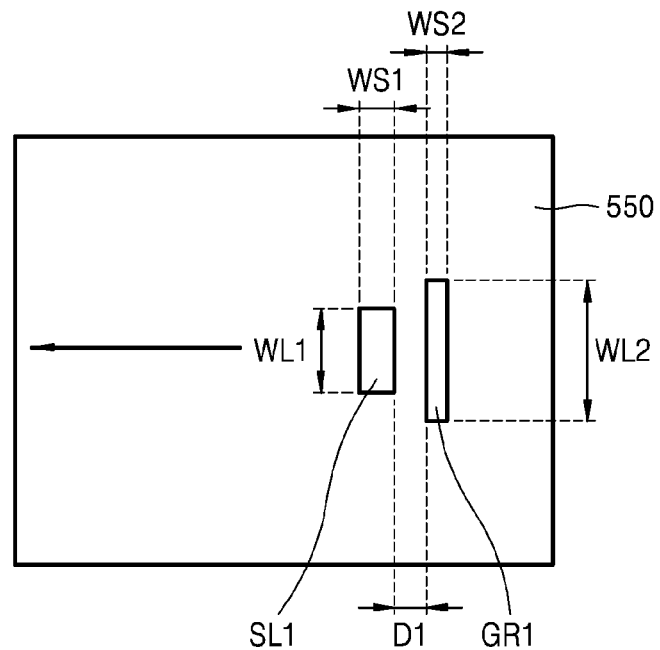

FIG. 14 is a cross-sectional view illustrating a schematic structure of a light interconnection device 500 according to another exemplary embodiment. FIGS. 15 and 16 are views illustrating a path of light that is transmitted to another layer by a plasmonic antenna of the light interconnection device 500.

The light interconnection device 500 includes a plurality of metal layers 520, 540, 560, and 580 and a plurality of dielectric layers 530, 550, and 570. The metal layers 520, 540, 560, and 580 alternate with the dielectric layers 530, 550, and 570.

The light interconnection device 500 may further include a light-emitting structure 510 that is configured to generate light and transmit the light to another device.

The light-emitting structure 510 may include a light-emitting layer that generates light, for example, an LD, an LED, an SLD, or the like. The light-emitting structure 510 may form light having a wavelength band corresponding to visible rays, near IR rays, terahertz waves, microwaves, or the like. The light-emitting structure 510 may include a semiconductor quantum well structure, a light-emitting dye, a quantum dot, or the like, and a light-emitting layer material appropriate for the kind of light to be generated.

Two metal layers and a dielectric layer disposed between the two metal layers form an MIM waveguide. In other words, the metal layer 520, the dielectric layer 530, and the metal layer 540 form an MIM waveguide WG1, the metal layer 540, the dielectric layer 550, and the metal layer 560 form an MIM waveguide WG2 in a next layer, and the metal layer 560, the dielectric layer 570, and the metal layer 580 form an MIM waveguide WG3 in a next layer.

The MIM waveguide WG1 and the MIM waveguide WG2 are connected to each other by a plasmonic antenna including a slot SL1 and a nano structure GR1, and the MIM waveguide WG2 and the MIM waveguide WG3 are connected to each other by a plasmonic antenna including a slot SL3 and a nano structure GR3. A plasmonic antenna including a slot SL4 and a nano structure GR4 is formed in the metal layer 580 that is an uppermost layer, and thus light $I_4$ is emitted from the light interconnection device 500.

Also, a plasmonic antenna including a slot SL2 and a nano structure GR2 may be disposed between the light-emitting structure 510 and the MIM waveguide WG1. A width of the slot SL2 may be wider than those of the slots SL1, SL3, and SL4 but is not limited thereto. The slot SL2 may be formed as a WG that guides light generated by the light-emitting structure 510 toward the MIM waveguide WG1.

The light interconnection device 500 of the present exemplary embodiment includes nano structures that are adjacent to plasmonic vias, so as to enable plasmonic antennas to have directivities. Also, the MIM waveguide WG1, the MIM waveguide WG2, and the MIM waveguide WG3 are connected to one another by the plasmonic antennas. The nano structures GR1, GR2, GR3, and GR4 all have groove shapes but are not limited thereto. The nano structures GR1, GR2, GR3, and GR4 may be modified to resemble nano structure PS such that the nano structures protrude from the surface of their respective metal layer as described with reference to FIG. 13. Also, the nano structures GR1, GR2, GR3, and GR4 are formed to respectively correspond to the slots SL1, SL2, SL3, and SL4, but this is only an exemplary embodiment. The number of nano structures may be changed.

In operation, light $I_0$ generated by the light-emitting structure 510 is incident into the MIM waveguide WG1 through the slot SL2. Here, the light $I_0$ travels in a right direction of the MIM waveguide WG1, by the nano structure GR2 giving directivity. The incident light $I_0$ travels along the MIM waveguide WG1, changes a path thereof toward the MIM waveguide WG2 through the slot SL1 to be incident into the MIM waveguide WG2, and travels in a left direction of the MIM waveguide WG2 by the nano structure GR1. The incident light $I_0$ travels along the MIM waveguide WG2, changes a path thereof through the slot SL3 to be incident into the MIM waveguide WG3, and travels in a left direction of the MIM waveguide WG3 by the nano structure GR3 to emit light $I_4$ from the light interconnection device 500 through the slot SL4. The light $I_4$ has directivity heading above the slot SL4 by the nano structure GR4 formed on the right side of the slot SL4.

The particular path of light that passes through a slot constituting a plasmonic antenna is determined according to shape and arrangement of the slot and nano structures. This will be described with reference to the exemplary path of light related to the nano structure GR1 in FIGS. 15 and 16.

FIG. 15 illustrates an exemplary path of light directed toward the slot SL1 in the dielectric layer 530. The light path changes direction in the vicinity of the slot SL1 and is directed into the slot SL1. The light is incident in the direction of the short width WS1 of the slot SL1, resonates in the direction of the short width WS1 in the slot SL1, and is emitted through the slot SL1. Here, directivity is formed in one direction by the nano structure GR1. In other words, among two directions perpendicular to the long width WL1 of the slot SL1, the light travels in a direction opposite to the nano structure GR1.

According to this principle, the orientation of the slot SL1 may be adjusted to adjust a direction of the light that passes through the slot SL1. In the present exemplary embodiment, the light is incident into the slot SL1 in a direction perpendicular to the long width WL1 of the slot SL1, and the nano structure GR1 is formed on the right side of the slot SL1. Therefore, after the light passes through the slot SL1, the light travels in a direction opposite to the direction in which the light is incident into the slot SL1, e.g., in a left direction, in the dielectric layer 530.

FIGS. 17 through 20 are views illustrating traveling directions of light that is focused in a plasmonic antenna according to arrangements of a slot and a nano structure of the plasmonic antenna.

Figure 17:
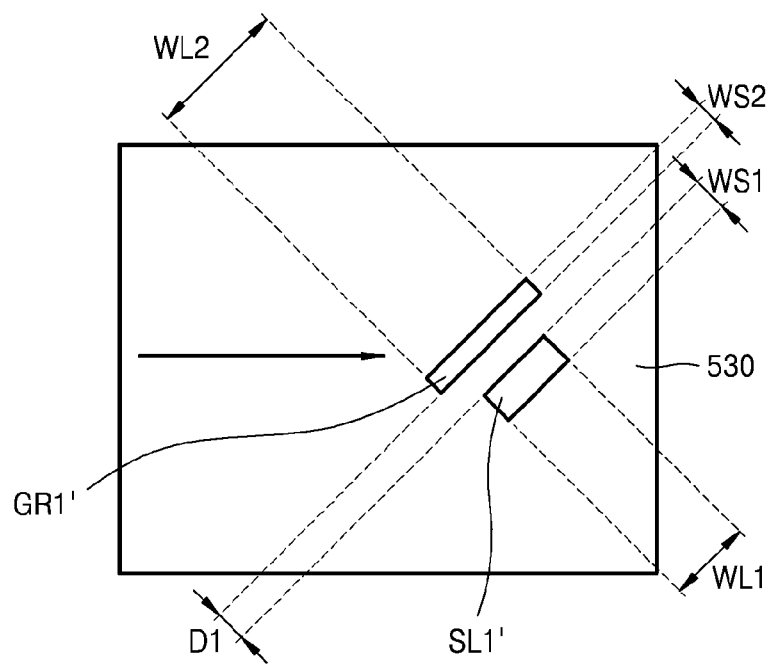
Figure 18:
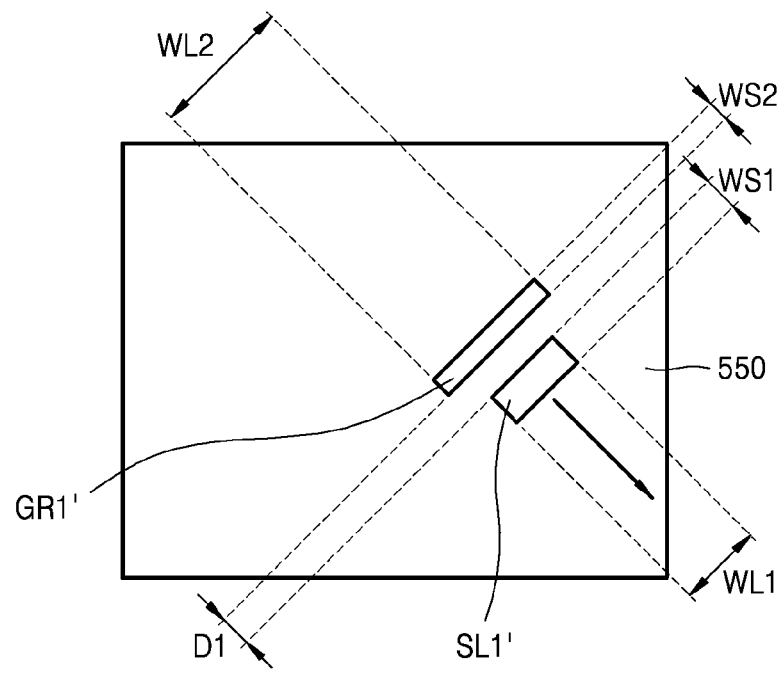

Referring to FIGS. 17 and 18, slot SL1' is oriented obliquely with respect to the traveling direction of the light in the dielectric layer 530. Light is focused in the slot SL1', resonates in the direction of the short width WS1 and is emitted, and, among directions parallel with the short width WS1 of the slot SL1', travels in a direction opposite to the nano structure GR1'.

Figure 19:
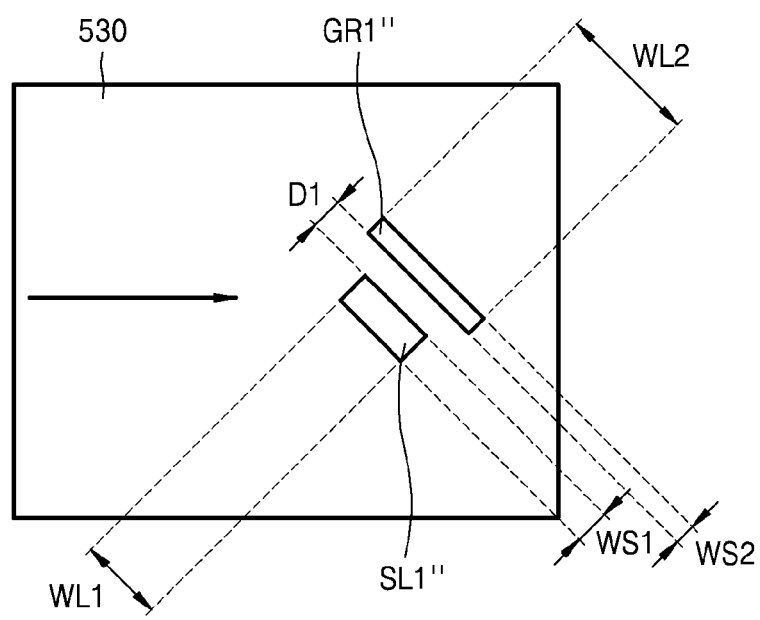
Figure 20:
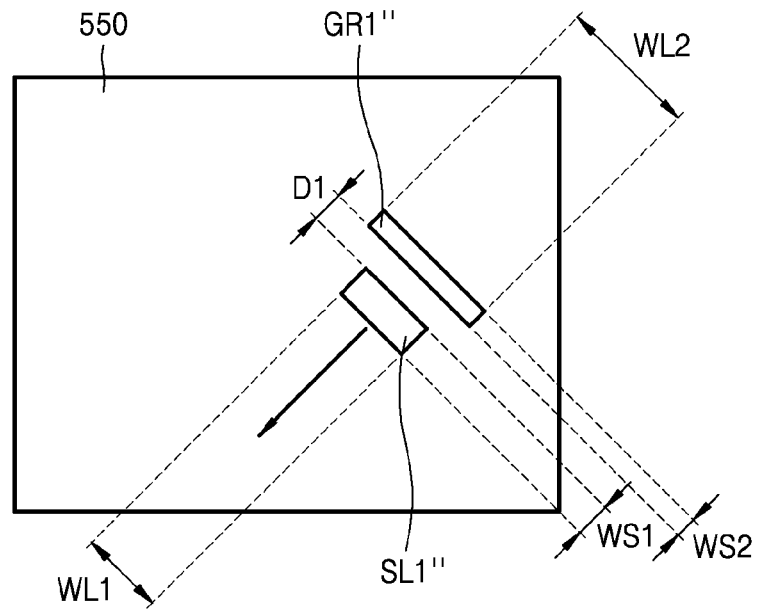

Referring to FIGS. 19 and 20, a slot SL1" is disposed to be oblique with respect to the traveling direction of the light in the dielectric layer 530. The slot SL1' of FIGS. 17 and 18 is rotated 90 degrees to provide slot SL1". Light is focused in the slot SL1", resonates in the direction of the short width WS1 and is emitted, and travels, among directions parallel with the short width WS1 of the slot SL1", in a direction opposite to the nano structure GR1" in the dielectric layer 550.

Figure 21:
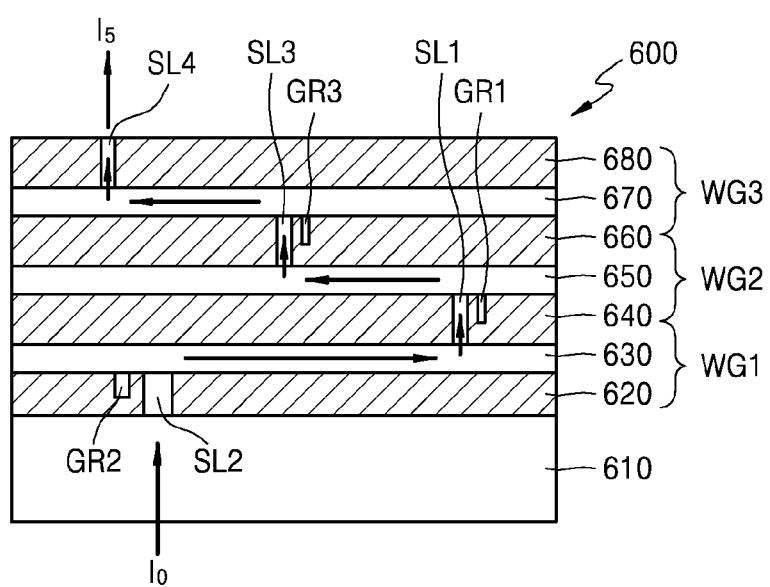
FIG. 21 is a cross-sectional view illustrating a schematic structure of a light interconnection device according to another exemplary embodiment.

FIG. 21 is a cross-sectional view illustrating a schematic structure of a light interconnection device 600 according to another exemplary embodiment.

The light interconnection device 600 includes a light-emitting structure 610, and a plurality of metal layers 620, 640, 660, and 680 and a plurality of dielectric layers 630, 650, and 670 that are formed on the light-emitting structure 610. The metal layers 620, 640, 660, and 680 alternate with the dielectric layers 630, 650, and 670.

Two metal layers and a dielectric layer disposed between the two metal layers form an MIM waveguide. In other words, the metal layer 620, the dielectric layer 630, and the metal layer 640 form an MIM waveguide WG1, the metal layer 640, the dielectric layer 650, and the metal layer 660 form an MIM waveguide WG2 in a next layer, and the metal layer 660, the dielectric layer 670, and the metal layer 680 form an MIM waveguide WG3 in a next layer.

The light interconnection device 600 of the present exemplary embodiment is different from the light interconnection device 500 in terms of the structure of the plasmonic antennas. For instance, the plasmonic antenna formed in the metal layer 680 that is an uppermost layer includes only a slot SL4, and plasmonic antennas formed in the metal layers 620, 640, and 660 are directional plasmonic antennas respectively including slots SL2, SL1, and SL3 and nano structures GR2, GR1, and GR3.

The nano structures GR2, GR1, and GR3 are all groove shapes, but this is only an exemplary embodiment. Some or all of the nano structures GR2, GR1, and GR3 may be modified to resemble nano structure PS such that the nano structures protrude from the surface of their respective metal layer as shown in FIG. 13. Also, the nano structures GR1, GR2, and GR3 are formed to respectively correspond to the slots SL1, SL2, and SL3, but this is only an exemplary embodiment. The number of nano structures may be changed.

Figure 22:
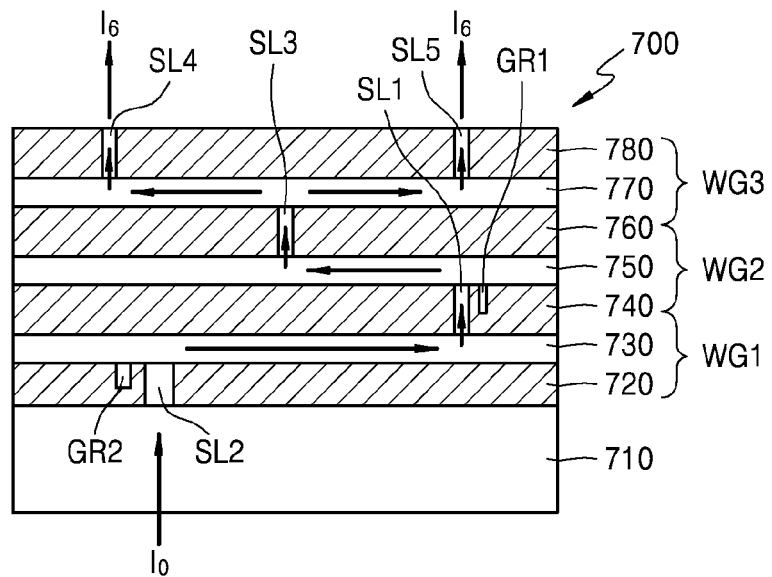
FIG. 22 is a cross-sectional view illustrating a schematic structure of a light interconnection device according to another exemplary embodiment.

FIG. 22 is a cross-sectional view illustrating a schematic structure of a light interconnection device 700 according to another exemplary embodiment.

The light interconnection device 700 includes a plurality of metal layers 720, 740, 760, and 780 and a plurality of dielectric layers 730, 750, and 770 that are formed on a light-emitting structure 710. The metal layers 720, 740, 760, and 780 alternate with the dielectric layers 730, 750, and 770.

Two metal layers and a dielectric layer disposed between the two metal layers form an MIM waveguide. In other words, the metal layer 720, the dielectric layer 730, and the metal layer 750 form an MIM waveguide WG1, the metal layer 740, the dielectric layer 750, and the metal layer 760 form an MIM waveguide WG2 in a next layer, and the metal layer 760, the dielectric layer 770, and the metal layer 780 form an MIM waveguide WG3 in a next layer.

Plasmonic antennas are disposed in the light interconnection device 700 so as to enable the light interconnection device 700 to operate as a light splitter, e.g., so as to emit light generated from the light-emitting structure 710 in two directions. More specifically, the plasmonic antennas formed in the metal layers 720 and 740 constitute directional antennas respectively including the slots SL2 and SL1 and the nano structures GR2 and GR1. A plasmonic antenna formed in the metal layer 760 includes only the slot SL3, and thus light passing through the slot SL3 travels in two directions along the MIM waveguide WG3. Light that travels in a left direction along the MIM waveguide WG3 passes through the slot SL4 formed in the metal layer 780, and light $I_6$ that passes through the slot SL4 heads above the slot SL4. Light that travels in a right direction along the MIM waveguide WG3 passes through the slot SL5 formed in the metal layer 780, and light $I_6$ that passes through the slot SL5 heads above the slot SL5.

Figure 23:
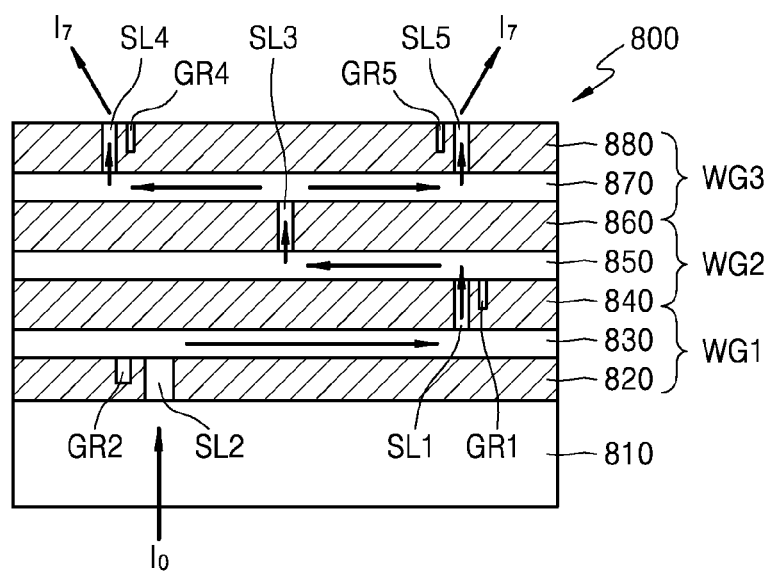
FIG. 23 is a cross-sectional view illustrating a schematic structure of a light interconnection device according to another exemplary embodiment.

FIG. 23 is a cross-sectional view illustrating a schematic structure of a light interconnection device 800 according to another exemplary embodiment.

The light interconnection device 800 includes a plurality of metal layers 820, 840, 860, and 880 and a plurality of dielectric layers 830, 850, and 870 that are formed on a light-emitting structure 810. The metal layers 820, 840, 860, and 880 alternate with the dielectric layers 830, 850, and 870.

Two metal layers and a dielectric layer disposed between the two metal layers form an MIM waveguide. In other words, the metal layer 820, the dielectric layer 830, and the metal layer 850 form an MIM waveguide WG1, the metal layer 840, the dielectric layer 850, and the metal layer 860 form an MIM waveguide WG2 in a next layer, and the metal layer 860, the dielectric layer 870, and the metal layer 880 form an MIM waveguide WG3 in a next layer.

The light interconnection device 800 of the present exemplary embodiment is similar to the light interconnection device 700 of FIG. 22 in that the light interconnection device 800 may operate as a light splitter. However, the light interconnection device 800 is different from the light interconnection device 700 of FIG. 22 in that plasmonic antennas formed in the metal layer 880 as an uppermost layer constitute directional plasmonic antennas.

Plasmonic antennas are configured to emit light generated by the light-emitting structure 810 in two directions. More specifically, the plasmonic antennas formed in the metal layers 820 and 840 constitute directional antennas respectively including slots SL2 and SL1 and nano structures GR2 and GR1. Also, the plasmonic antenna formed in the metal layer 860 includes only a slot SL3, and thus light that passes through the slot SL3 travels in two directions along the MIM waveguide WG3. Light that travels in a left direction along the MIM waveguide WG3 passes through a slot SL4 formed in the metal layer 880, and light $I_7$ that passes through the slot SL4 heads above a left side of the slot SL4 by a nano structure GR4 formed on the right side of the slot SL4. Light that travels in a right direction along the MIM waveguide WG3 passes through a slot SL5 formed in the metal layer 880, and light $I_7$ that passes through the slot SL5 heads above a right side of the slot SL5 by a nano structure GR5 formed on the left side of the slot SL5.

The nano structures GR1, GR2, GR4, and GR5 shown in FIGS. 22 and 23 are all groove shapes but are not limited thereto. The nano structures GR1, GR2, GR4, and GR5 may be modified to resemble nano structure PS such that the nano structures protrude from the surface of their respective metal layer as shown in FIG. 13. Also, the nano structures GR1, GR2, GR4, and GR5 are formed to respectively correspond to the slots SL1, SL2, SL4, and SL5, but this is only an exemplary embodiment. The number of nano structures may be changed.

According to the above-described exemplary embodiments, a 3D stack structure is formed to interconnect light in a desired direction by using MIM waveguides and plasmonic vias but is not limited to the illustrated detailed structure. Various combinations or modifications may be made according to exemplary embodiments.

As described above, according to the one or more of the above exemplary embodiments, a light interconnection device may control a traveling direction of light by using a plasmonic via that transmits light energy through a plasmonic effect.

The light interconnection device may rapidly transmit a signal without a complicated wire structure and may be applied to an IC to increase integration.

While one or more exemplary embodiments have been described with reference to the figures, it will be understood by those of ordinary skill in the art that various changes in form and details may be made therein without departing from the spirit and scope as defined by the following claims.

What is claimed is:

1. A light interconnection device comprising:
a first metal-insulator-metal (MIM) waveguide comprising first and second metal layers and a dielectric layer provided between the first and second metal layers;
a first plasmonic antenna comprising a first slot penetrating through the second metal layer,
wherein the first plasmonic antenna further comprises a first nano structure that is adjacent to the first slot and is provided on the second metal layer, and
wherein a distance between the first nano structure and the first slot is configured so that the first plasmonic antenna has a directivity, the directivity being from the first slot to a direction opposite to the first nano structure;
a light-emitting structure configured to supply light into the first MIM waveguide; and
a second plasmonic antenna that is provided between the light-emitting device and the first MIM waveguide and comprises a second slot penetrating through the first metal layer,
wherein the second plasmonic antenna further comprises a second nano structure that is provided on the first metal layer and is adjacent to the second slot.

2. The light interconnection device of claim 1, wherein the first slot has a hexahedral shape.

3. The light interconnection device of claim 2, wherein the first slot has a rectangular parallelepiped shape having a first depth corresponding to a thickness of the second metal layer, and a first short width and a first long width perpendicular to the first depth.

4. The light interconnection device of claim 3, wherein at least one of the first short width and the first long width is configured to be adjusted to thereby adjust a resonance wavelength of the first plasmonic antenna.

5. The light interconnection device of claim 3, wherein directions of the first short width and the first long width are configured to be adjusted to thereby adjust directivity of the first plasmonic antenna.

6. The light interconnection device of claim 1, wherein the first nano structure is selected from the group consisting of: a groove that is formed in the second metal layer, and a protrusion structure that protrudes from the second metal layer.

7. The light interconnection device of claim 1, wherein the first slot has a rectangular parallelepiped shape having a first depth corresponding to a thickness of the second metal layer, and a first short width and a first long width perpendicular to the first depth.

8. The light interconnection device of claim 7, wherein the first nano structure has a rectangular parallelepiped shape having a second depth corresponding to a thickness of the second metal layer, and a second short width and a second long width perpendicular to the second depth.

9. The light interconnection device of claim 8, wherein the second depth is less than the first depth.

10. The light interconnection device of claim 1, wherein the dielectric layer comprises first and second clad layers respectively contacting the first and second metal layers and a core layer provided between the first and second clad layers, wherein a dielectric constant of the core layer is higher than dielectric constants of the first and second clad layers.

11. The light interconnection device of claim 1, wherein the second nano structure is selected from the group consisting of: a groove that is formed in the first metal layer, and a protrusion structure that protrudes from the first metal layer.

12. The light interconnection device of claim 11, wherein the second nano structure and the second slot have rectangular parallelepiped shapes, wherein at least one of a depth, a long width, and a short width of each of the rectangular parallelepiped shapes of the second nano structure and second slot are different from each other.

13. A light interconnection device comprising:
a first metal-insulator-metal (MIM) waveguide comprising first and second metal layers and a dielectric layer provided between the first and second metal layers;
a first plasmonic antenna comprising a first slot penetrating through the second metal layer;
a light-emitting structure configured to supply light into the first MIM waveguide;
a second plasmonic antenna that is provided between the light-emitting device and the first MIM waveguide and comprises a second slot penetrating through the first metal layer;
a second MIM waveguide comprising a third metal layer spaced apart from the second metal layer and a dielectric layer provided between the second and third metal layers; and
a third plasmonic antenna that comprises a third slot penetrating through the third metal layer.

14. The light interconnection device of claim 13, wherein the third plasmonic antenna further comprises a third nano structure that is provided on the third metal layer and is adjacent to the third slot.

15. The light interconnection device of claim 13, further comprising:
a fourth plasmonic antenna that is spaced apart from the third slot along the second MIM waveguide and comprises a fourth slot penetrating through the third metal layer.

16. The light interconnection device of claim 15, wherein the fourth plasmonic antenna further comprises a fourth nano structure that is provided on the third metal layer and is adjacent to the fourth slot.

* * * * *